(12) United States Patent
Min et al.

(10) Patent No.: US 9,105,936 B2
(45) Date of Patent: Aug. 11, 2015

(54) FUEL CELL CATALYST, METHOD OF PREPARING SAME, AND MEMBRANE-ELECTRODE ASSEMBLY FOR FUEL CELL AND FUEL CELL SYSTEM INCLUDING SAME

(75) Inventors: Myoung-Ki Min, Yongin-si (KR); Chan-Hee Park, Yongin-si (KR); Chan Kwak, Yongin-si (KR); Alexey Alexandrovichserov, Yongin-si (KR); Go-Ul Choi, Yongin-si (KR); Geun-Seok Chai, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 1372 days.

(21) Appl. No.: 11/936,683

(22) Filed: Nov. 7, 2007

(65) Prior Publication Data
US 2008/0248372 A1      Oct. 9, 2008

(30) Foreign Application Priority Data

Nov. 20, 2006  (KR) .................. 10-2006-0114533

(51) Int. Cl.
*H01M 8/10* (2006.01)
*H01M 4/92* (2006.01)

(52) U.S. Cl.
CPC .............. *H01M 4/921* (2013.01); *H01M 4/926* (2013.01); *H01M 8/1009* (2013.01); *H01M 2008/1095* (2013.01); *Y02E 60/50* (2013.01)

(58) Field of Classification Search
CPC ... H01M 4/921; H01M 4/926; H01M 8/1009; H01M 2008/1095; Y02E 60/50
USPC .................. 429/499, 524, 483; 502/326, 101
See application file for complete search history.

(56) References Cited

U.S. PATENT DOCUMENTS

| | | | | | |
|---|---|---|---|---|---|
| 4,716,087 | A | * | 12/1987 | Ito et al. .................. | 429/498 |
| 4,970,128 | A | * | 11/1990 | Itoh et al. ................. | 429/498 |
| 5,024,905 | A | * | 6/1991 | Itoh et al. ................. | 429/524 |

(Continued)

FOREIGN PATENT DOCUMENTS

| EP | 0 386 764 A2 | 9/1990 |
|---|---|---|
| EP | 1 479 121 B1 | 12/2007 |

(Continued)

OTHER PUBLICATIONS

Patent Abstracts of Japan, Publication No. 02-061961; Date of Publication: Mar. 1, 1990; in the name of Masaru Ito, et al.

(Continued)

*Primary Examiner* — Gary Harris
(74) *Attorney, Agent, or Firm* — Christie, Parker & Hale, LLP

(57) ABSTRACT

A fuel cell catalyst includes a platinum-iron (Pt—Fe) alloy having an ordered or disordered face-centered cubic structure or face-centered tetragonal structure. The face-centered cubic structure has a lattice constant ranging from about 3.820 Å to about 3.899 Å (or from about 3.862 Å to about 3.880 Å), and the face-centered tetragonal structure has a first lattice constant ranging from about 3.800 Å to about 3.880 Å (or from about 3.810 Å to about 3.870 Å) and a second lattice constant ranging from about 3.700 Å to about 3.810 Å (or from about 3.710 Å to about 3.800 Å). A membrane-electrode assembly can improve cell performance by including the above catalyst having the relatively high activity and selectivity for an oxidant reduction in at least one of an anode or a cathode, and can increase lifespan by inhibiting catalyst poisoning.

15 Claims, 6 Drawing Sheets

(56) References Cited

U.S. PATENT DOCUMENTS

| | | | |
|---|---|---|---|
| 5,068,161 A | 11/1991 | Keck et al. | |
| 5,189,005 A | 2/1993 | Watanabe et al. | |
| 5,876,867 A * | 3/1999 | Itoh et al. | 429/524 |
| 6,861,387 B2 | 3/2005 | Ruth et al. | |
| 7,132,385 B2 | 11/2006 | Pak | |
| 7,479,343 B2 * | 1/2009 | Devenney et al. | 429/523 |
| 7,635,533 B2 | 12/2009 | Fan et al. | |
| 2005/0085379 A1 * | 4/2005 | Ishihara et al. | 502/180 |
| 2005/0238936 A1 | 10/2005 | Cho | |
| 2007/0087261 A1 | 4/2007 | Endoh et al. | |
| 2007/0160899 A1 * | 7/2007 | Atanassova et al. | 429/44 |
| 2008/0050640 A1 * | 2/2008 | Sun et al. | 429/40 |

FOREIGN PATENT DOCUMENTS

| | | |
|---|---|---|
| JP | 2-61961 | 3/1990 |
| JP | 2-236960 | 9/1990 |
| JP | 6-97615 | 11/1994 |
| JP | 9-206597 | 8/1997 |
| JP | 2003-45442 | 2/2003 |
| JP | 36-43552 B2 | 2/2005 |
| JP | 2005-317546 | 11/2005 |
| JP | 2006-281205 | 10/2006 |
| KR | 10-2002-0084825 | 11/2002 |
| KR | 10-2005-0031017 | 4/2005 |
| KR | 10-2005-0103648 | 11/2005 |
| KR | 10-2006-0048970 | 5/2006 |
| KR | 10-0823502 B1 | 4/2008 |
| KR | 10-0842298 B1 | 6/2008 |
| WO | WO 2005/024982 A | 3/2005 |

OTHER PUBLICATIONS

Patent Abstracts of Japan, Publication No. 02-236960; Date of Publication: Sep. 19, 1990; in the name of Masaru Ito, et al.

Patent Abstracts of Japan, Publication No. 09-206597; Date of Publication: Aug. 12, 1997; in the name of Taizo Yamamoto, et al.

Patent Abstracts of Japan, Publication No. 2003-045442; Date of Publication: Feb. 14, 2003; in the name of Hisao Kato, et al.

Korean Patent Abstracts, Publication No. 1020060048970 A; Date of Publication: May 18, 2006; in the name of Kimitaka Sato.

Berger, M., *Scientists are one step closer to advanced applications of magnetic FePt nanoparticles* Nanowerk LLC, (2006), http//www.nanowerk.com/spotlight/spotid=301.php, 1 page.

U.S. Office action dated Dec. 21, 2011, for cross reference U.S. Appl. No. 12/656,262, 16 pages.

European Office action dated Jul. 4, 2011, for European Patent application 10151209.3, corresponding to cross reference U.S. Appl. No. 12/656,262, (4 pages).

KIPO Office action dated Mar. 17, 2011, for Korean Patent application KR 10-2009-0050031, priority Patent application to cross reference U.S. Appl. No. 12/656,262, (4 pages).

\* cited by examiner

FUEL CELL CATALYST, METHOD OF PREPARING SAME, AND MEMBRANE-ELECTRODE ASSEMBLY FOR FUEL CELL AND FUEL CELL SYSTEM INCLUDING SAME

CROSS-REFERENCE TO RELATED APPLICATION

This application claims priority to and the benefit of Korean Patent Application No. 10-2006-0114533 filed in the Korean Intellectual Property Office on Nov. 20, 2006, the entire content of which is incorporated herein by reference.

BACKGROUND OF THE INVENTION

1. Field of the Invention

The present invention relates to a fuel cell catalyst, a method of preparing the same, and a membrane-electrode assembly and a fuel cell system including the same.

2. Description of the Related Art

A fuel cell is a power generation system for producing electrical energy through an electrochemical redox reaction of an oxidant and a hydrocarbon-based material such as methanol, ethanol, or natural gas.

A fuel cell is a clean energy alternative that can replace fossil fuels. It includes a stack composed of unit cells and produces various ranges of power.

Representative exemplary fuel cells include a polymer electrolyte membrane fuel cell (PEMFC) and a direct oxidation fuel cell (DOFC). The direct oxidation fuel cell includes a direct methanol fuel cell, which uses methanol as a fuel.

The polymer electrolyte fuel cell has relatively high energy density and high power output, but requires extra handling capabilities for processing hydrogen gas and related accessories, such as a fuel reforming processor for reforming methane, methanol, natural gas, etc., in order to produce a hydrogen gas (or hydrogen-rich gas) as the fuel gas.

In contrast, a direct oxidation fuel cell has lower energy density than that of the polymer electrolyte fuel cell, but it does not need a fuel reforming processor and can operate at room temperature due to its relatively low operation temperature.

In a fuel cell, the stack that generates electricity includes unit cells that are stacked in multiple layers, and each of the unit cells is composed of a membrane-electrode assembly (MEA) and one or more separators (also referred to as bipolar plates). The membrane-electrode assembly has an anode (also referred to as a fuel electrode or an oxidation electrode), a cathode (also referred to as an air electrode or a reduction electrode), and an electrolyte membrane (e.g., a polymer electrolyte membrane) between the anode and the cathode.

A fuel is supplied to the anode and absorbed in a catalyst thereof, and the fuel is oxidized to produce protons and electrons. The electrons are transferred to (or into) the cathode via an external circuit, and the protons are transferred to (or into) the cathode through the electrolyte membrane (or polymer electrolyte membrane). An oxidant is supplied to the cathode, and the oxidant, protons, and electrons are reacted on a catalyst at the cathode to produce heat along with water.

SUMMARY OF THE INVENTION

Aspects of embodiments of the present invention are directed toward a fuel cell catalyst having relatively high activity and selectivity for oxidant reduction, a method of preparing the same, a membrane-electrode assembly including the same, and a fuel cell system including the same.

An aspect of an embodiment of the present invention is directed toward a fuel cell catalyst for a fuel cell that has relatively high activity and selectivity for reduction of an oxidant, and can improve the lifespan of a fuel cell due to inhibition of fuel crossover and oxidation of carbon monoxide (CO), which is a catalyst poisoning material.

Another aspect of an embodiment of the present invention is directed toward a method of preparing the fuel cell catalyst.

Another aspect of an embodiment of the present invention is directed toward a membrane-electrode assembly for a fuel cell including the fuel cell catalyst.

Another aspect of an embodiment of the present invention is directed toward a fuel cell system including the fuel cell catalyst.

An embodiment of the present invention provides a fuel cell catalyst that includes a platinum-iron (Pt—Fe) alloy having a face-centered cubic structure or a face-centered tetragonal structure. The face-centered cubic and face-centered tetragonal structures may be ordered or disordered structures.

In one embodiment, the face-centered cubic structure has a lattice constant ranging from about 3.820 Å to about 3.899 Å, and the face-centered tetragonal structure has a first lattice constant ranging from about 3.800 Å to about 3.880 Å and a second lattice constant ranging from about 3.700 Å to about 3.810 Å.

In one embodiment, the lattice constant of the face-centered cubic structure ranges from about 3.862 Å to about 3.880 Å, and the first lattice constant of the face-centered tetragonal structure ranges from about 3.810 Å to about 3.870 Å and the second lattice constant of the face-centered tetragonal structure ranges from about 3.710 Å to about 3.800 Å.

In one embodiment, an atomic ratio of Pt:Fe ranges from about 2:1 to about 9:1 when the platinum-iron alloy has the face-centered cubic structure.

In one embodiment, an atomic ratio of Pt:Fe is more than 4:1 and less than or equal to 9:1 when the platinum-iron alloy has the face-centered cubic structure.

In one embodiment, an atomic ratio of Pt:Fe ranges from about 1:1 to about 1:3 when the platinum-iron alloy has the face-centered tetragonal structure.

In one embodiment, the platinum-iron alloy further includes a transition metal (M) selected from the group consisting of V, Cr, Mn, Ni, Cu, W, Ti, and combinations thereof. The atomic ratio of Pt:M may range from about 2:1 to about 10:1.

In one embodiment, the platinum-iron alloy has an average particle diameter ranging from about 3 to about 10 nm.

In one embodiment, the platinum-iron alloy is supported on a carrier selected from the group consisting of a carbon-based material, an inorganic material particulate, and mixtures thereof. The inorganic material particulate may be an oxide including a material selected from the group consisting of Al, Si, Zr, Ti, W, and combinations thereof.

In one embodiment, the platinum-iron alloy is supported on a carrier in an amount ranging from about 50 to about 90 wt % based on a total weight of the catalyst.

In one embodiment, the catalyst is a direct oxidation fuel cell catalyst.

In one embodiment, the catalyst is a cathode catalyst.

According to another embodiment of the present invention, provided is a method of preparing a fuel cell catalyst that includes mixing a platinum-containing material with an iron-containing material to prepare a mixture, drying the mixture, and performing a heat treatment of the mixture to obtain an alloy.

In one embodiment, the method further includes the step impregnating the mixture on a carrier before the step performing a heat treatment of the mixture. Alternatively, the method includes the step supporting a platinum-containing material on a carrier before the step mixing a platinum-containing material with an iron-containing material to prepare a mixture.

Nonlimiting examples of the platinum-containing material include platinum, $H_2PtCl_6$, $PtCl_2$, $PtBr_2$, $(NH_3)_2Pt(NO_2)_2$, $K_2PtCl_6$, $K_2PtCl_4$, $K_2[Pt(CN)_4]3H_2O$, $K_2Pt(NO_2)_4$, $Na_2PtCl_6$, $Na_2[Pt(OH)_6]$, platinum acetylacetonate, ammonium tetrachloroplatinate, or mixtures thereof.

Nonlimiting examples of the iron-containing material include iron-containing metal halide, nitrate, hydrochloride, sulfate, acetate, amine, or mixtures thereof.

In the preparation of the mixture, an M metal-containing material, where M is a transition metal selected from the group consisting of V, Cr, Mn, Ni, Cu, W, Ti, and combinations thereof, may further be added.

In one embodiment, the M metal-containing material is selected from the group consisting of an M metal-containing metal halide, nitrate, hydrochloride, sulfate, acetate, amine, and mixtures thereof.

In one embodiment, the heat treatment is performed at a temperature ranging from about 250 to about 1100° C.

In one embodiment, the heat treatment is performed under a reducing atmosphere.

The alloy obtained by the heat treatment may be placed in an acid solution to remove unalloyed Fe.

According to still another embodiment of the present invention, provided is a membrane-electrode assembly for a fuel cell including an anode, a cathode facing the anode, and a polymer electrolyte membrane interposed between the anode and the cathode. At least one of the anode or the cathode includes a catalyst according to an embodiment of the present invention (e.g., the catalyst as described above).

According to further another embodiment of the present invention, provided is a fuel cell system including an electricity generating element that includes a membrane-electrode assembly according to an embodiment of the present invention (e.g., the membrane-electrode assembly as described above) and a separator positioned at either side of the membrane-electrode assembly, a fuel supplier that supplies the electricity generating element with a fuel, and an oxidant supplier that supplies the electricity generating element with an oxidant.

DETAILED DESCRIPTION OF THE EMBODIMENTS

Figure 1:
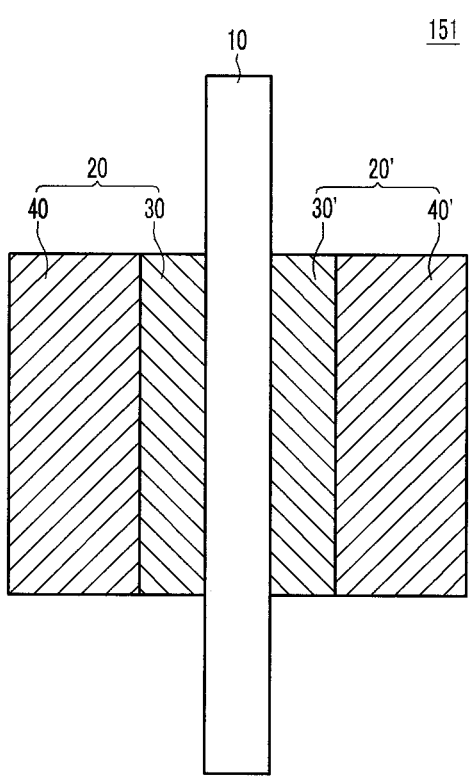
FIG. 1 is a schematic cross-sectional view showing a membrane-electrode assembly according to an embodiment of the present invention.

A fuel cell is a power generation system for generating electrical energy through oxidation of a fuel and reduction of an oxidant. The oxidation of a fuel occurs at an anode, while the reduction of an oxidant occurs at a cathode.

The anode includes a catalyst layer that includes a catalyst to aid (or increase) the oxidation of the fuel, and the cathode includes a catalyst layer that includes a catalyst to aid (or increase) the reduction of the oxidant. In one embodiment, the catalyst for the anode catalyst layer representatively includes platinum-ruthenium, and the catalyst for the cathode catalyst layer may include platinum.

However, the cathode catalyst utilizing pure platinum has a low oxidant reduction problem. Also, in a direct oxidation fuel cell, the cathode catalyst utilizing pure platinum can also be depolarized by a fuel that crosses over toward the cathode through an electrolyte membrane, thereby becoming deactivated. Therefore, there is a need for another catalyst that can substitute pure platinum.

Accordingly, one embodiment of the present invention provides a catalyst for a fuel cell that includes a Pt—Fe alloy active material. Here, the catalyst, including the Pt—Fe alloy active material, has a certain crystal structure by controlling an atomic ratio of platinum and iron and the heat treatment conditions. As such, the catalyst has relatively high selectivity and activity for an oxidant reaction so that cell performance can be improved. In addition, the catalyst prevents (or reduces) attachment of carbon monoxide (CO), which is a catalyst deactivating material, on the surface of the platinum during the fuel oxidation. The attachment of CO is harmful to the catalyst because its presence reduces the lifespan of the catalyst due to the catalyst deactivation.

The fuel cell catalyst according to one embodiment of the present invention may be an alloy catalyst having an ordered and/or disordered face-centered cubic structure and/or a face-centered tetragonal structure. The alloy has a face-centered cubic structure that has a lattice constant (a) ranging from about 3.820 Å to about 3.899 Å (or from 3.820 Å to 3.899 Å; or alternatively more than 3.862 Å and less than or equal to 3.899 Å), and/or has a face-centered tetragonal structure that has a lattice constant (a) ranging from about 3.800 Å to about 3.880 Å (or from 3.800 Å to 3.880 Å) and a lattice constant (c) ranging from about 3.700 Å to about 3.810 Å (or from 3.700 Å to 3.810 Å).

In one embodiment, when the crystal lattice is a face-centered cubic structure having a lattice constant (a) that is less than or equal to 3.862 Å, the catalyst alloy is unstable because the gap between one platinum atom to another platinum atom is excessively decreased, thereby releasing the iron particles from the lattice. On the other hand, when the crystal lattice is a face-centered cubic structure having a lattice constant (a) that is more than 3.899 Å, the iron is not alloyed with the platinum and the iron is present on the surface of the platinum, and is therefore melted during the fuel cell reaction. In one embodiment of the present invention, the catalyst has a lattice constant (a) ranging from about 3.862 Å to about 3.880 Å (or from 3.862 Å to 3.880 Å; or alternatively more than 3.862 Å and less than or equal to 3.880 Å).

The catalyst may have a lattice constant (a) that ranges from about 3.800 Å to about 3.880 Å (or from 3.800 Å to 3.880 Å) and a lattice constant (c) that ranges from about 3.700 Å to about 3.810 Å (or from 3.700 Å to 3.810 Å) when the catalyst has a face-centered tetragonal structure. In one embodiment, the lattice constant (a) ranges from about 3.810 Å to about 3.870 Å (or from 3.810 Å to 3.870 Å), and the lattice constant (c) ranges from about 3.710 Å to about 3.800 Å (or from 3.710 Å to 3.800 Å).

When the catalyst has a face-centered tetragonal structure, it has the same (or substantially the same) lattice constant (a) that ranges from 3.800 Å to 3.880 Å and lattice constant (c) that ranges from 3.700 Å to 3.810 Å as in the face-centered cubic structure. The iron amount remained in the lattice determines the type of structure. That is, the face-centered tetragonal structure has more iron in the platinum lattice than the face-centered cubic structure. If the atomic ratio of platinum and iron is 2:1, in which there is more platinum than iron, the structure is a face-centered cubic structure. Otherwise, if the iron amount is increased, it becomes a face-centered tetragonal structure.

The catalyst includes an alloy of Pt and Fe to oxidize carbon monoxide generated while the fuel cell is driven to generate carbon dioxide. Therefore, carbon monoxide is absorbed on the platinum surface to prevent (or reduce) the hydrogen gas inflow into the platinum catalyst, and thereby prevents (or reduces) catalyst deactivation and improves cell lifespan and efficiency.

The atomic ratio of Pt:Fe ranges from about 2:1 to about 9:1 (or from 2:1 to 9:1) in the case of a face-centered cubic structure. According to another embodiment, the atomic ratio of Pt:Fe ranges from about 2:1 to about 4:1 (or from 2:1 to 4:1). According to another embodiment of the present invention, the atomic ratio of Pt:Fe is more than 4:1 and less than or equal to 9:1.

When a catalyst has a face-centered tetragonal structure, the atomic ratio of Pt:Fe may range from about 1:1 to about 1:3 (or from 1:1 to 1:3). According to another embodiment, the atomic ratio of Pt:Fe ranges from 1:1 to 1:2. When the Fe amount is less than the above range, it is impossible (or difficult) to improve the catalyst performance because the Fe interaction is insufficient. On the other hand, when the Fe amount is more than the above range, Fe ions are dissolved to deactivate a polymer electrolyte membrane.

In addition, the catalyst may further include a transition metal (M) in addition to the Pt—Fe alloy catalyst to provide an at least three element (or metal) alloy.

The transition metal (M) may include a transition metal selected from the group consisting of V, Cr, Mn, Ni, Cu, W, Ti, and combinations thereof. According to one embodiment, the transition metal (M) includes W or Ti.

The transition metal (M) can be alloyed with Pt—Fe and can be used to stabilize the catalyst and/or increase catalyst activity. The atomic ratio of Pt:M ranges from about 2:1 to about 10:1 (or from 2:1 to 10:1). According to another embodiment, the atomic ratio of Pt:M ranges from about 4:1 to about 7:1 (or from 4:1 to 7:1). When the transition metal (M) amount is less than the above range, it is impossible (or difficult) to improve the catalyst performance because the M interaction is insufficient. On the other hand, when the M amount is more than the above range, the performance may be deteriorated because the M can be dissolved and contaminates the electrolyte and the electrodes.

The platinum-iron alloy has an average particle diameter ranging from about 3 to about 10 nm (or from 3 to 10 nm). According to another embodiment, the platinum-iron alloy has an average particle diameter ranging from 4 to 7 nm (or from about 4 to about 7 nm). When the average particle diameter is less than 3 nm, the alloy catalyst is unstable and becomes aggregated, thereby decreasing the surface area of the catalyst. When the average particle diameter is more than 10 nm, the particles are too large to provide the catalyst with sufficient efficiency.

The platinum-iron alloy may be used as a black phase, or it may be supported on a carrier. When it is supported on the carrier, the catalyst particle diameter may be decreased to increase the reaction surface area thereof. In this specification, the term "black" denotes a catalyst metal that is not supported on a carrier.

The carrier may include a carbon-based material such as graphite, denka black, ketjen black, acetylene black, carbon nanotube, carbon nanofiber, carbon nanowire, carbon nano ball, or activated carbon; or an inorganic material particulate, which is an oxide of a material selected from the group consisting of Al, Si, Zr, Ti, W, and combinations thereof. According to another embodiment, the inorganic material is alumina, silica, zirconia, and/or titania.

According to another embodiment, the carrier includes tungsten oxide and/or titanium oxide since they have improved catalyst activity. When the carrier includes tungsten oxide and/or titanium oxide, the interaction between the catalyst and the carrier is improved to such a degree that the electrical conductivity and the electro structure are changed to easily carry out the desired reaction.

When the catalyst is supported on the carrier, the amount of catalyst supported on the carrier may range from about 50 to about 90 wt % (or from 50 to 90 wt %). According to another embodiment, the amount of catalyst supported on the carrier ranges from about 60 to about 85 wt % (or from 60 to 85 wt %). When the amount is less than 50 wt %, the amount is too low to maintain the catalyst activity, and the catalyst layer is too thick to inhibit the mass transport and the reaction area. On the other hand, when it is more than 90 wt %, the catalyst activity is deteriorated due to the aggregation between catalyst particles.

In certain embodiments of the present invention, the above-mentioned catalyst for a fuel cell may be prepared in accordance with the following procedures.

Hereinafter, the catalyst is described depending upon the type of catalyst: one is a black type catalyst where the catalyst is not supported on a carrier, and the other is a catalyst supported on a carrier.

Firstly, a black type catalyst preparing method is described. The catalyst is formed by a method that includes: mixing a platinum-containing material with an iron-containing material in a solvent, drying the mixture, and performing a heat treatment on the mixture.

Examples of the platinum-containing material include a material selected from the group consisting of platinum, $H_2PtCl_6$, $PtCl_2$, $PtBr_2$, $(NH_3)_2Pt(NO_2)_2$, $K_2PtCl_6$, $K_2PtCl_4$, $K_2[Pt(CN)_4]3H_2O$, $K_2Pt(NO_2)_4$, $Na_2PtCl_6$, $Na_2[Pt(OH)_6]$, platinum acetylacetonate, ammonium tetrachloroplatinate, and mixtures thereof. According to one embodiment, $H_2PtCl_6$ may be appropriate.

Examples of the iron-containing material include a material selected from the group consisting of an iron-containing metal halide, nitrate, hydrochloride, sulfate, acetate, amine, and mixtures thereof. According to one embodiment, $Fe(NO_3)_3$, $Fe(CH_3COO)_2$, or $FeCl_3$ may be appropriate.

When the Pt—Fe alloy catalyst further includes a transition metal (M), an M-containing material is further added and mixed therewith.

The M-containing material may include any suitable compound such as an M-containing metal halide, nitrate, hydrochloride, sulfate, acetate, and/or amine. According to one embodiment, the M-containing material includes an M-containing metal nitrate or hydrochloride.

The solvent includes water; an alcohol such as methanol, ethanol, isopropanol, etc.; or mixtures thereof.

The mixing ratio of the materials including each of the metals (or elements) may be adjusted by considering the atomic ratio of the metals (or elements) in the catalyst.

The drying process for the mixture is performed to evaporate the solvent in the mixture and includes ultra-sonication. After performing the drying process, a pulverizing step is further included so that it is possible to provide a mixture with finer particles.

According to one embodiment, the heat treatment is performed at a temperature ranging from about 250 to about 1100° C. (or from 250 to 1100° C.). According to another embodiment, the heat treatment is performed at a temperature ranging from about 300 to about 900° C. (or from 300 to 900° C.). When the heat treatment temperature is less than 250° C., the raw materials are insufficiently decomposed or crystallinity is not satisfied. When it is more than 1100° C., the particle diameter is enlarged due to the aggregation of catalyst particles or the alloy is not uniform.

The heat treatment process may be performed under a reduction atmosphere such as hydrogen, carbon monoxide, nitrogen, and so on. According to another embodiment, it is performed under a 10% hydrogen atmosphere and/or a 10% CO atmosphere since CO may deactivate the catalyst metal to prevent the aggregation of particles.

Additionally, the catalyst preparation method may further include a leaching test to remove unalloyed Fe after the heat treatment.

The leaching test removes the unalloyed Fe by adding to the heated alloy an acid solution such as sulfuric acid, nitric acid, hydrochloric acid, and so on. According to one embodiment, the acid solution has a concentration ranging from about 0.5 to about 3 M (or from 0.5 to 3 M). According to another embodiment, the concentration ranges from about 1 to about 2M (or from 1 to 2M). When the concentration of the acid solution is less than 0.5M, the duration for completely dissolving the unalloyed Fe is too long. On the other hand, when it is more than 3M, the alloyed Fe may be dissolved.

The leaching test may be performed for a time period ranging from about 0.1 hour to about 24 hours (or from 0.1 hour to 24 hours). According to one embodiment, the time period ranges from about 0.5 hour to about 5 hours (or from 0.5 hour to 5 hours). When the leaching test is shorter than 0.1 hour, the duration is too short to dissolve all unalloyed Fe. On the other hand, when it is longer than 24 hours, it may dissolve even the alloyed Fe catalyst.

Now, a process for preparing a catalyst supported on a carrier is described. Hereinafter, details of the same (or substantially the same) materials and the same (or substantially the same) processes as in the black type catalyst preparing method are not provided again.

A platinum-containing material and an iron-containing material are mixed in a solvent to provide a mixture. The mixture is supported on a carrier, dried, and then a heat treatment is performed. Alternatively, after supporting a platinum-containing material on a carrier, a solution including an Fe-containing material is mixed with the carrier to cover the carrier with iron and a heat treatment is performed.

According to one embodiment, the carrier is further added with a Na metal salt in order to provide the basic carrier and to promote formation of an alloy.

The carrier is the same (or substantially the same) as described above, and the platinum-containing material, the iron-containing material, the solvent, and the heat treatment conditions are the same (or substantially the same) as described in the method for preparing the black type alloy catalyst.

In one embodiment, the catalyst supported on the carrier further includes a M-containing material to provide a Pt—Fe-M containing alloy catalyst during the preparation of the Pt—Fe alloy catalyst supported on the carrier. The M-containing material is the same (or substantially the same) as described above in the alloy catalyst manufacturing method.

The provided catalyst has relatively high activity and selectivity for oxidant reduction, and so it can be effectively applied to a direct oxidation fuel cell to solve the crossover problem. According to another embodiment, it is applied to a direct methanol fuel cell (DMFC).

The catalyst for the fuel cell may be applied to both the cathode and the anode. In one embodiment, the catalyst is applied to the cathode because it has a relatively higher beneficial effect to the cathode.

The cathode and the anode are formed not depending on the materials thereof and but by their functions. Electrodes for the fuel cell include a fuel (e.g., hydrogen, methanol, ethanol, or formic acid) oxidation anode and an oxygen (air) reduction cathode. In other words, hydrogen or fuel is supplied to the anode and oxygen is supplied to the cathode to generate electrical energy due to the electrochemical reaction of the anode and the cathode. A voltage difference is generated between the anode and the cathode since oxidation occurs in (or at) the anode and reduction occurs in (or at) the cathode.

According to another embodiment of the present invention, a membrane-electrode assembly for a fuel cell including an anode and a cathode facing each other and a polymer electrolyte membrane interposed therebetween is provided. At least one of the anode or the cathode includes the above catalyst.

FIG. 1 is a schematic cross-sectional view of a membrane-electrode assembly 151 according to an embodiment of the present invention.

Referring to FIG. 1, the membrane-electrode assembly 151 includes an anode 20 and a cathode 20' facing each other and a polymer electrolyte membrane 10 interposed therebetween.

The anode 20 and the cathode 20' respectively include electrode substrates 40 and 40', and catalyst layers 30 and 30'.

The electrode substrates 40 and 40' support the catalyst layers 30 and 30' and provide pathways for transferring fuel and oxidant to the catalyst layers 30 and 30'.

In one embodiment, the electrode substrates 40 and 40' are formed from a conductive material such as carbon paper, carbon cloth, and/or carbon felt; and/or a metal cloth that includes a metal film formed on a surface of a porous cloth film and/or a cloth composed of polymer fibers. However, the electrode substrate is not limited thereto.

The electrode substrates 40 and 40' may include water-repellent fluoro-based resins to prevent (or reduce) deterioration of diffusion efficiency due to the water generated during operation of a fuel cell. The fluoro-based resin may include polytetrafluoroethylene, polyvinylidene fluoride, polyhexafluoropropylene, polyperfluoroan alkylvinylether, polyperfluorosulfonylfluoridealkoxyvinyl ether, fluorinated ethylene propylene, polychlorotrifluoroethylene, or copolymers thereof.

The catalyst layers 30 and 30' are respectively disposed on the electrode substrates 40 and 40'.

The catalyst layers 30 and 30' provide catalytic effects to related reactions, i.e., oxidation of a fuel and reduction of an oxidant, and include catalysts.

The catalysts included in the anode 20 and the cathode 20' are the same (or substantially the same) as above.

The catalyst layers 30 and 30' may further include a binder resin to improve adherence and proton transference.

The binder resin may be a proton conductive polymer resin having a cation exchange group selected from the group consisting of a sulfonic acid group, a carboxylic acid group, a phosphoric acid group, a phosphonic acid group, and derivatives thereof, at its side chain. Non-limiting examples of the polymer include at least one proton conductive polymer selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers.

In one embodiment, the proton conductive polymer is selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), poly(2,5-benzimidazole), copolymers thereof, and mixtures thereof.

The binder resin may include one type of binder or more than one type in form of a mixture. Additionally, the binder resin may be used along with a non-conductive polymer to improve adherence between the polymer electrolyte membrane and the catalyst layer. The use amount of the binder resin may be adjusted in accordance to its usage purpose.

Non-limiting examples of the non-conductive polymer include polytetrafluoroethylene (PTFE), tetrafluoroethylene-hexafluoropropylene copolymers (FEP), tetrafluoroethylene-perfluoro alkyl vinylether copolymers (PFA), ethylene/tetrafluoroethylene (ETFE)), ethylenechlorotrifluoro-ethylene copolymers (ECTFE), polyvinylidene fluoride, polyvinylidene fluoride-hexafluoropropylene copolymers (PVdF-HFP), dodecyl benzene sulfonic acid, sorbitol, and combinations thereof.

A microporous layer (MPL) can be added between the aforementioned electrode substrates 40 and 40' and the catalyst layers 30 and 30' to increase reactant diffusion effects. The microporous layer includes conductive powders with a certain particle diameter. The conductive material may include, but is not limited to, a carbon powder, carbon black, acetylene black, activated carbon, carbon fiber, fullerene, carbon nanotubes, carbon nanowire, carbon nanohorns, carbon nanorings, and combinations thereof.

The microporous layer is formed by coating a composition including a conductive powder, a binder resin, and a solvent on the conductive substrate. The binder resin may include, but is not limited to, polytetrafluoro ethylene, polyvinylidene fluoride, polyvinyl alcohol, cellulose acetate, polyhexafluoro propylene, polyperfluoroalkylvinyl ether, polyperfluoro sulfonylfluoride alkoxy vinyl ether, and copolymers thereof. The solvent may include, but is not limited to, an alcohol such as ethanol, isopropyl alcohol, n-propylalcohol, butanol, and so on, water, dimethyl acetamide, dimethyl sulfoxide, and N-methylpyrrolidone. The coating method may include, but is not limited to, screen printing, spray coating, doctor blade methods, gravure coating, dip coating, silk screening, painting, and so on, depending on the viscosity of the composition.

The polymer electrolyte membrane 10 is interposed between the anode 20 and the cathode 20'.

The polymer electrolyte membrane 10 is for exchanging ions by transferring the protons produced from a catalyst layer 30 of the anode 20 to a catalyst layer 30' of the cathode 20'. The proton conductive polymer for the polymer electrolyte membrane 10 according to one embodiment of the present invention may be any suitable polymer resin having a cation exchange group selected from the group consisting of a sulfonic acid group, a carboxylic acid group, a phosphoric acid group, a phosphonic acid group, and derivatives thereof, at its side chain.

Non-limiting examples of the polymer resin include at least one proton conductive polymer selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, and polyphenylquinoxaline-based polymers. In one embodiment, the proton conductive polymer is selected from the group consisting of poly(perfluorosulfonic acid) (commercially available NAFION), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), poly(2,5-benzimidazole), and copolymers thereof.

Herein, H can be replaced with Na, K, Li, Cs, or tetrabutylammonium in a proton conductive group of the proton conductive polymer. In one embodiment, when H is replaced with Na in an ion exchange group at the terminal end of the proton conductive group, NaOH is used. In one embodiment, when H is replaced with tetrabutyl ammonium, tetrabutyl ammonium hydroxide is used. K, Li, or Cs can also be used to replace H by using appropriate compounds (e.g., suitable hydroxide compounds).

The membrane-electrode assembly can improve cell performance by including a catalyst having relatively high activity and selectivity for oxidant reduction in at least one of an anode or a cathode, and increase its lifespan by oxidizing a catalyst poisoning material, e.g., carbon monoxide.

According to another embodiment of the present invention, a fuel cell system including the above membrane-electrode assembly is provided.

A fuel cell system of the present invention includes one or more electricity generating elements, a fuel supplier, and an oxidant supplier.

The electricity generating element includes a membrane-electrode assembly and a separator positioned at either side of the membrane-electrode assembly. The electricity generating element generates electricity through oxidation of a fuel and reduction of an oxidant.

The fuel supplier is for supplying the electricity generating element with a fuel including hydrogen, and the oxidant supplier is for supplying the electricity generating element with an oxidant. The oxidant includes oxygen or air. The fuel includes liquid or gaseous hydrogen, or a hydrocarbon-based fuel such as methanol, ethanol, propanol, butanol, or natural gas.

Figure 2:
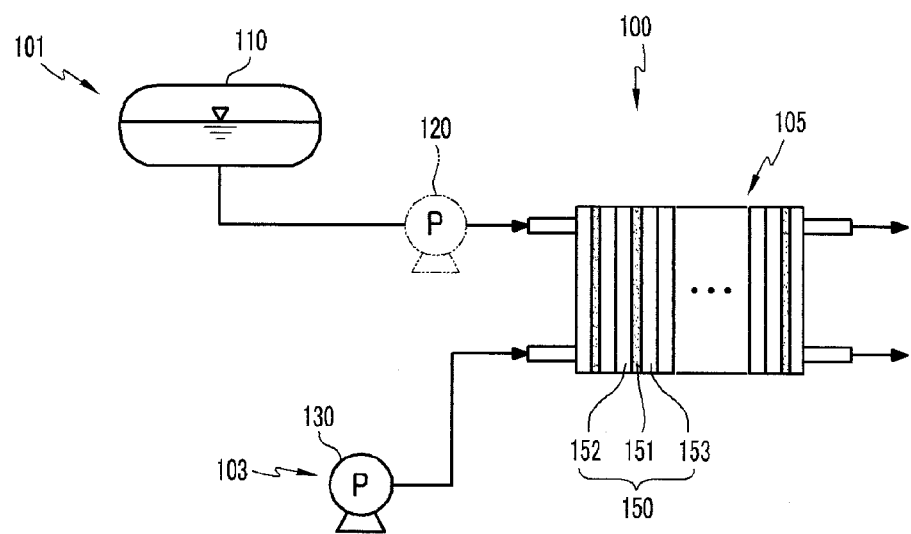
FIG. 2 is a schematic diagram showing a structure of a fuel cell system according to an embodiment of the present invention.

FIG. 2 shows a schematic structure of a fuel cell system 100 in more detail. In the fuel cell system 100 of FIG. 2, a fuel and an oxidant are provided to the electricity generating element 150 through pumps 120 and 130, but the present invention is not limited to such a structure. The fuel cell system of the present invention may alternatively include a structure wherein a fuel and an oxidant are provided in a diffusion manner.

The fuel cell system 100 includes an electricity generating element (or elements) 150 that generates electrical energy through an electrochemical reaction of a fuel and an oxidant, a fuel supplier 101 for supplying a fuel to the electricity generating element 150, and an oxidant supplier 103 for supplying an oxidant to the electricity generating element 150.

In addition, the fuel supplier 101 is equipped with a tank 110 that stores the fuel, and the pump 120 that is connected therewith. The fuel pump 120 supplies the fuel stored in the tank 110 with a pumping power that may be predetermined.

The oxidant supplier 103, which supplies the electricity generating element 150 with an oxidant, is equipped with a pump (or pumps) 130 for supplying the oxidant with a pumping power that may be predetermined.

The electricity generating element 150 includes a membrane-electrode assembly 151 that oxidizes hydrogen (or a fuel) and reduces an oxidant, and separators 152 and 153 that are respectively positioned at opposite sides of the membrane-electrode assembly 151 to supply hydrogen (or a fuel), and an oxidant, respectively. In one embodiment as shown in FIG. 2, multiple electricity generating elements 150 are staked adjacent to one another to constitute a stack 105.

The following examples illustrate the present invention in more detail. However, the present invention is not limited by these examples.

EXAMPLE 1

Chloroplatinic acid and iron nitrate were mixed in water to provide a mixture with a Pt:Fe molar ratio of 3:1. The mixture was dried at 100° C. for 1 hour and subjected to a heat treatment at 700° C. under a hydrogen atmosphere.

The powder obtained after the heat treatment was impregnated in 1M sulfuric acid solution to dissolve unalloyed Fe to provide a $Pt_3Fe$ metal alloy catalyst.

The average particle diameter of the $Pt_3Fe$ catalyst was 7 nm and the crystal lattice constant was a=3.878 Å.

EXAMPLE 2

Chloroplatinic acid and iron nitrate were mixed in water solvent to provide a mixture with a Pt:Fe molar ratio of 1:1. The mixture was dried at 100° C. for 1 hour and subjected to a heat treatment under a hydrogen atmosphere at 700° C. to provide a powder. The powder was impregnated in 1M sulfuric acid solution to dissolve unalloyed Fe to provide a PtFe metal alloy catalyst.

The average particle of PtFe catalyst was 6.8 nm, and the crystal lattice constants thereof were a=3.825 Å and c=3.778 Å.

EXAMPLE 3

A Pt/C catalyst (platinum content: 66 wt %) was mixed with and dispersed in a 0.1M $FeCl_2$ aqueous solution to provide a mixture. The contents of the Pt/C catalyst and the $FeCl_2$ were 3:1 based on the molar ratio of Pt:Fe.

The mixture was dried at 100° C. for 1 hour, and subjected to a heat treatment under a mixed gas of hydrogen and nitrogen (volume ratio of hydrogen:nitrogen 10:90) at 700° C. for 2.5 hours.

The powder obtained from the heat treatment was impregnated in 1M sulfuric acid solution for 1 hour to dissolve the unalloyed Fe and to provide a $Pt_3Fe/C$ catalyst.

The $Pt_3Fe$ alloy had a lattice constant of a=3.880 Å. The average particle diameter of the alloy was 7 nm, and the amount of $Pt_3Fe$ supported in the carbon carrier was 68 wt %.

EXAMPLE 4

Chloroplatinic acid, iron nitrate, and tungsten nitrate were mixed in a water solvent to provide a ratio of Pt:Fe:W of 1:0.25:0.25 and supported on a titania carrier. The catalyst was dried and subjected to a heat treatment under a hydrogen atmosphere at 700° C., then fired to provide a powder. The powder was impregnated in a 1M sulfuric acid solution for 1 hour to dissolve the unalloyed Fe and to provide a Pt—Fe—W metal alloy catalyst supported on a titania carrier.

The lattice constant of Pt—Fe—W was a=3.870 Å, and the average particle diameter of the alloy was 6.5 nm. The Pt—Fe—W metal alloy amount supported on the titania carrier was 68.3 wt %.

COMPARATIVE EXAMPLE 1

Ketjen black was heated at 500° C. for 10 hours under an air atmosphere. Then, 5 g of the heated ketjen black was subjected to an acid treatment by mixing with 500 ml of $HNO_3$ at room temperature for 24 hours and filtrated. Subsequently, the obtained ketjen black was washed with water and desulfurized by reheating under an air atmosphere at 500° C. for 24 hours in order to remove sulfurs that might be present as impurities.

30 parts by weight of the desulfurized ketjen black was dropped with 70 parts by weight of a Pt precursor solution of a $H_2PtCl_6$ solution to provide a catalyst precursor. The provided catalyst precursor was dried by ultra sonication and heated under a $H_2$ atmosphere at 200° C. to provide a Pt catalyst supported on a carbon for a fuel cell. The Pt amount supported on the carbon carrier was 66 wt %.

COMPARATIVE EXAMPLE 2

Chloroplatinic acid and iron nitrate were mixed in a water solvent to provide a mixture with a Pt:Fe molar ratio of 1:1. The mixture was dried at 100° C. for 1 hour and heated under a hydrogen atmosphere at 1100° C. to provide a PtFe metal alloy catalyst.

The PtFe catalyst had an average particle diameter of 8.9 nm and a composition ratio of 1:1, but had a face-centered cubic structure instead of face-centered tetragonal structure. This resulted from iron enriched on the surface of the platinum. The crystal lattice constant of the catalyst was a=3.861 Å.

The catalysts obtained from Examples 1 and 2 were measured for X-ray diffraction (XRD) pattern with a X-Pert MPD1 (manufactured by PHILIPS Fe). The results are shown in FIG. 3 and FIG. 4.

Figure 3:
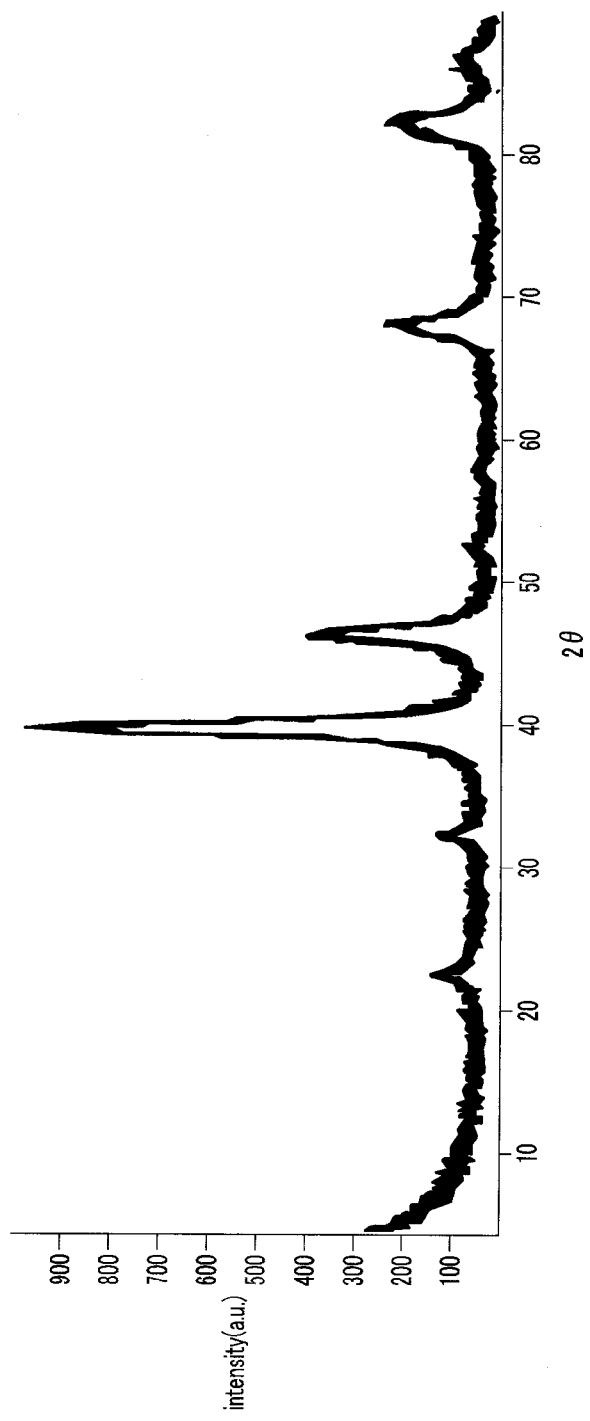
FIG. 3 is a graph showing an X-ray diffraction (XRD) pattern of a catalyst according to Example 1 of the present invention.
Figure 4:
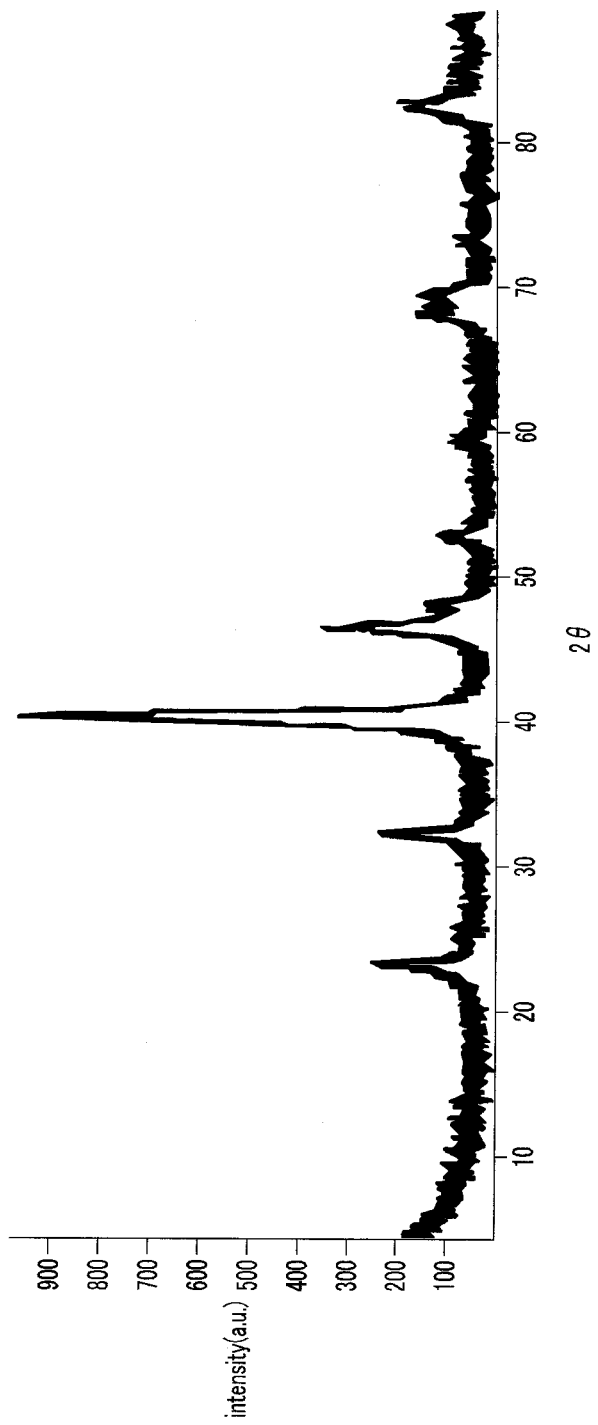
FIG. 4 is a graph showing an X-ray diffraction (XRD) pattern of a catalyst according to Example 2 of the present invention.

FIG. 3 is a graph showing an X-ray diffraction (XRD) pattern of the catalyst according to Example 1 of the present invention, and FIG. 4 is a graph showing an X-ray diffraction (XRD) pattern of the catalyst according to Example 2 of the present invention A face-centered tetragonal structure is denoted when the peak has two split tips at XRD 2θ of 68-70 degrees to denote the diffraction occurs on the planes with the Miller indices of (220) and (202). However, if the peak has only one tip without any splits at 68-70 degrees, the peak indicates that it is a face-centered cubic structure to denote the diffraction occurs on the plane with the Miller indices of (220).

According to the results, the catalyst obtained from Example 1 had a face-centered cubic structure with a Pt:Fe=3:1 composition, and the catalyst obtained from Example 2 had a face-centered tetragonal structure with a Pt:Fe=1:1 composition.

As shown in FIG. 3 and FIG. 4, it is confirmed by the appearance of the ultra-lattice peak that platinum was well alloyed with iron. The transferring peaks toward higher 2θ indicate that the lattice is contracted during alloying.

EXAMPLE 5

The catalyst provided from Example 3 was introduced into a solvent of water and isopropyl alcohol mixed in a volume ratio of 10:80, and mixed with 25 parts by weight of a Nafion solution (Nafion 1100 EW, manufactured by DuPont), then agitated by applying ultrasonic waves to provide a composition for a catalyst layer.

The provided composition for the catalyst layer was sprayed onto a TEFLON (tetrafluoroethylne) treated carbon paper substrate (cathode/anode=SGL 31BC/10DA; manufactured by SGL Carbon Group) to provide a cathode. The same procedure was applied with a PtRu black catalyst (HiSPEC 6000, manufactured by Johnson Matthey) to provide an anode. The catalyst for the anode was loaded in 6 mg/cm$^2$, and the catalyst for the cathode was loaded in 4 mg/cm$^2$.

The anode and the cathode were placed with a commercially available polymer electrolyte membrane for a fuel cell (catalyst Feated membrane-type Fuel Cell MEA, manufactured by DuPont; Nafion 115 Membrane) to provide a membrane/electrode assembly. The provided membrane electrode assembly was inserted between a gasket, and interposed between two separators formed with a certain shaped gas flow channel and cooling channel, and compressed between copper end plates to provide a single cell.

COMPARATIVE EXAMPLE 3

A single cell was manufactured by the same (or substantially the same) procedure as in Example 5 except that the catalyst obtained from Comparative Example 1 was used.

Figure 5:
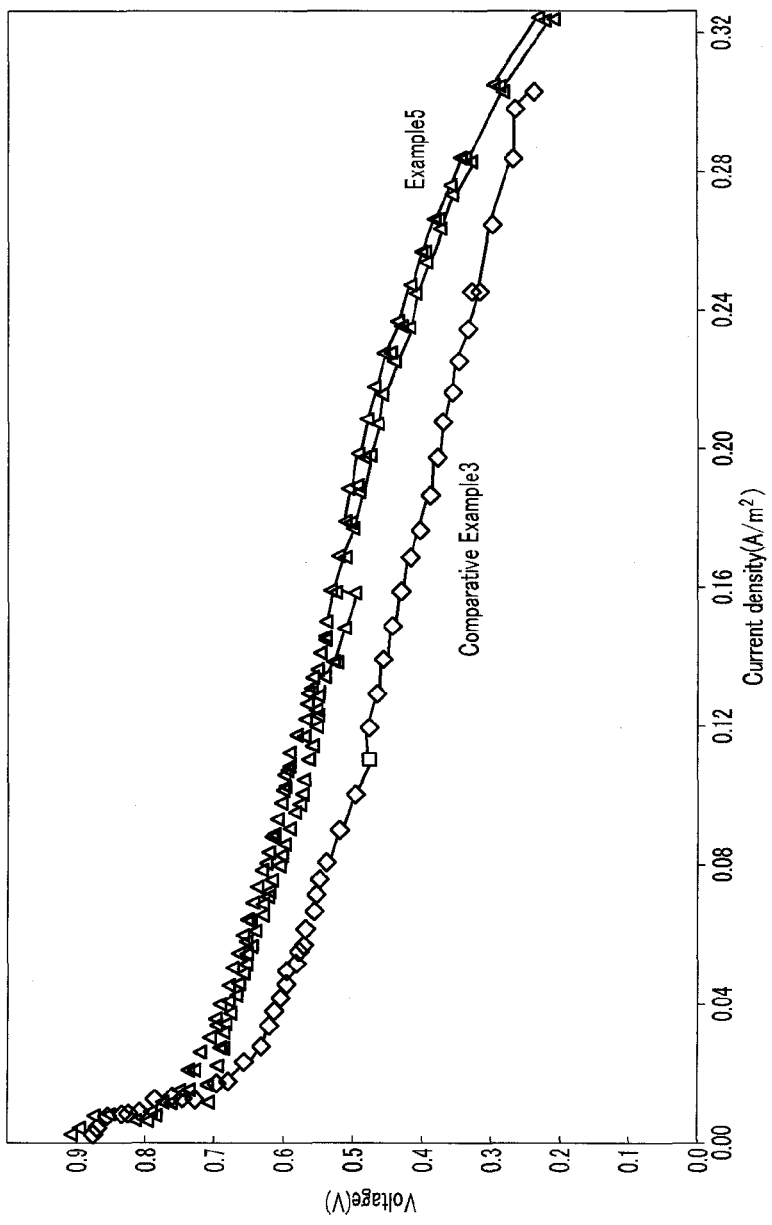
FIG. 5 is a graph showing voltage drop characteristics of single cells according to Example 5 and Comparative Example 3.
Figure 6:
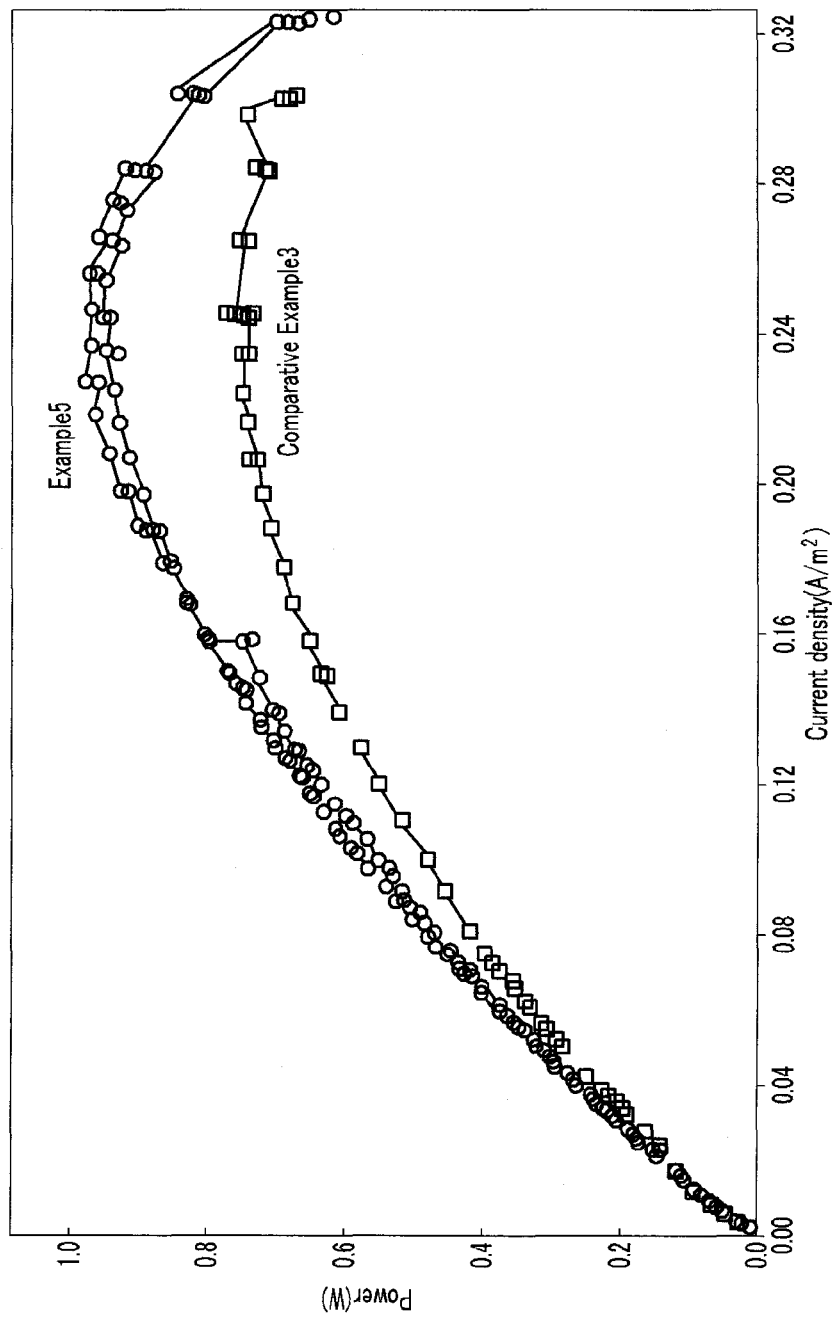
FIG. 6 is a graph showing power characteristics of single cells according to Example 5 and Comparative Example 3.

Single cells provided from Example 5 and Comparative Example 3 were operated under 1M methanol and dried air to measure voltage drop characteristics and power density for the cell. The results are shown in FIGS. 5 and 6. The data of Example 5 were obtained with two-time repeat measurements.

FIG. 5 is a graph showing voltage drop characteristics of the single cells according to Example 5 and Comparative Example 3, and FIG. 6 is a graph showing power characteristics of the single cells according to Example 5 and Comparative Example 3.

As shown in FIGS. 5 and 6, the single cell according to Example 5 including the catalyst according to Example 3 had superior voltage drop characteristics and power characteristics to those of Comparative Example 3 including the catalyst according to Comparative Example 1.

It is shown that the catalyst according to Example 3 had increased catalyst activity by 2 to 30% more than that of Comparative Example 1. Although the supported amounts of the metal catalysts were similar, the oxygen reduction reactivity of the platinum-iron alloy catalyst according to Example 3 was greater than that of Comparative Example 1 and the platinum-iron alloy catalyst had a methanol-resistance that does not absorb CO.

In view of the foregoing, a membrane-electrode assembly according to an embodiment of the present invention improves cell performance by including a catalyst having relatively high activity and selectivity for an oxidant reduction at (or in) at least one of an anode or a cathode, and can increase its lifespan by inhibiting catalyst poisoning.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A fuel cell catalyst comprising:
   an alloy having a face-centered cubic structure, the alloy consisting of platinum, iron and at least one transition metal (M) selected from the group consisting of Cr, Mn, Ni, W, and Ti,
   wherein the face-centered cubic structure has a lattice constant ranging from about 3.820 Å to about 3.899 Å.

2. The fuel cell catalyst of claim 1, wherein the lattice constant of the face-centered cubic structure ranges from about 3.862 Å to about 3.880 Å.

3. The fuel cell catalyst of claim 1, wherein an atomic ratio of Pt:Fe ranges from about 2:1 to about 9:1 when the alloy has the face-centered cubic structure.

4. The fuel cell catalyst of claim 1, wherein the atomic ratio of Pt:M ranges from about 2:1 to about 10:1.

5. The fuel cell catalyst of claim 1, wherein the alloy has an average particle diameter ranging from about 3 to about 10 nm.

6. The fuel cell catalyst of claim 1, wherein the alloy is supported on a carrier selected from the group consisting of a carbon-based material, an inorganic material particulate, and mixtures thereof.

7. The fuel cell catalyst of claim 6, wherein the inorganic material particulate is an oxide comprising a material selected from the group consisting of Al, Si, Zr, Ti, W, and combinations thereof.

8. The fuel cell catalyst of claim 1, wherein the alloy is supported on a carrier in an amount ranging from about 50 to about 90 wt % based on a total weight of the catalyst.

9. The fuel cell catalyst of claim 1, wherein the catalyst is a direct oxidation fuel cell catalyst.

10. The fuel cell catalyst of claim 1, wherein the catalyst is a cathode catalyst.

11. A membrane-electrode assembly for a fuel cell, comprising:
    an anode;
    a cathode facing the anode; and
    a polymer electrolyte membrane between the anode and cathode,
    wherein at least one of the anode or the cathode comprises an alloy having a face-centered cubic structure, the alloy consisting of platinum, iron and at least one selected from the group consisting of Cr, Mn, Ni, W, and Ti, and
    wherein the face-centered cubic structure has a lattice constant ranging from about 3.820 Å to about 3.899 Å.

12. A fuel cell system comprising:
    an electricity generating element comprising a membrane-electrode assembly and a separator at either side of the membrane-electrode assembly;
    a fuel supplier for supplying the electricity generating element with a fuel; and
    an oxidant supplier for supplying the electricity generating element with an oxidant,
    wherein the membrane-electrode assembly comprises an anode and a cathode facing each other, and
    a polymer electrolyte membrane between the anode and cathode,
    wherein at least one of the anode or the cathode comprises an alloy having a face-centered cubic structure, the alloy consisting of platinum, iron and at least one transition metal (M) selected from the group consisting of Cr, Mn, Ni, W, Ti, and combinations thereof, and wherein the lattice constant of the face-centered cubic structure ranges from about 3.820 Å to about 3.899 Å.

13. The fuel cell catalyst of claim 1, wherein the at least one transition metal (M) is selected from the group consisting of Cr, Mn, Ni, and Ti.

14. The membrane-electrode assembly of claim 11, wherein the at least one transition metal (M) is selected from the group consisting of Cr, Mn, Ni, and Ti.

15. The fuel cell system of claim 12, wherein the at least one transition metal (M) is selected from the group consisting of Cr, Mn, Ni, and Ti.

* * * * *